US008582155B2

(12) United States Patent
Jarvis

(10) Patent No.: US 8,582,155 B2
(45) Date of Patent: Nov. 12, 2013

(54) WIRELESS LOCATION BASED RENDERING JOB DELIVERY SYSTEM AND METHOD

(75) Inventor: Daniel T. Jarvis, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 301 days.

(21) Appl. No.: 12/853,696

(22) Filed: Aug. 10, 2010

(65) Prior Publication Data

US 2012/0038944 A1 Feb. 16, 2012

(51) Int. Cl.
*G06F 15/00* (2006.01)
*G06F 17/30* (2006.01)

(52) U.S. Cl.
USPC ............... 358/1.15; 707/769; 707/E17.014

(58) Field of Classification Search
USPC ................... 358/1.15; 707/769, E17.014
See application file for complete search history.

(56) References Cited

U.S. PATENT DOCUMENTS

| | | | |
|---|---|---|---|
| 7,065,446 B2 | 6/2006 | Chou | |
| 7,352,865 B2 | 4/2008 | Gassho et al. | |
| 2002/0075509 A1* | 6/2002 | Wiechers | 358/1.15 |
| 2004/0125401 A1 | 7/2004 | Earl et al. | |
| 2004/0220997 A1 | 11/2004 | De Saint-Johns | |
| 2008/0007767 A1* | 1/2008 | Ishimaru | 358/1.15 |
| 2008/0130050 A1* | 6/2008 | Tamai et al. | 358/1.15 |

* cited by examiner

*Primary Examiner* — Qian Yang
(74) *Attorney, Agent, or Firm* — Kermit D. Lopez; Luis M. Ortiz; Ortiz & Lopez, PLLC

(57) ABSTRACT

A wireless location based rendering job delivery system and method. An account with respect to a remote recipient can be subscribed to a globally accessible network cloud and GPS location data with respect to the remote recipient can be transmitted to the network cloud via a mobile communication device. A rendering job including job metadata with respect to a submitter can be transmitted to the network cloud and a list of recipients capable of receiving the rendering job in the network cloud can be provided. The rendering job metadata can be matched along with the recipient GPS location data to determine an appropriate print center in order to submit the rendering job. The rendering job can then be delivered to the recipient based on the location data thereby maintaining complete privacy.

20 Claims, 4 Drawing Sheets

WIRELESS LOCATION BASED RENDERING JOB DELIVERY SYSTEM AND METHOD

TECHNICAL FIELD

Embodiments are generally related to rendering devices such as, for example, printers, scanners, photocopy machines, multi-function devices, and the like. Embodiments are also related to location and tracking systems. Embodiments are additionally related to methods for delivering a rendering job to a remote recipient.

BACKGROUND OF THE INVENTION

Networked rendering devices can interact with an assemblage of other rendering devices, client devices, servers, and other components that are connected to and communicate over a network. One example of a rendering device is a MFD (Multi-Function Device), which includes the functionality of multiple rendering devices such as printers, scanners, faxes, copy machines, and so forth.

Most prior art rendering job delivery systems electronically transmit a rendering job with respect to a remote recipient based on a job requirement. Such prior art systems do not include location data with respect to the remote recipient which places burden on the recipient to determine an appropriate rendering device for rendering the document. Additionally, such approaches do not provide an expedient and efficient means for delivering the rendering document to the remote recipient whose location varies.

Based on the foregoing, it is believed that a need exist for an improved wireless location-based rendering job delivery system and method. A need also exists for delivering a rendering job with respect to a remote recipient based on location data, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for configuring a networked rendering device such as, for example, a printer, scanner, photocopy machine, fax machine, and/or a MFD.

It is another aspect of the disclosed embodiments to provide for an improved wireless location based rendering job delivery system and method.

It is a further aspect of the disclosed embodiments to provide for an improved method for delivering a rendering job with respect to a remote recipient based on location data.

The aforementioned aspects and other objectives and advantages can now be achieved as described herein. A wireless location based rendering job delivery system and method is disclosed herein. An account with respect to a remote recipient can be subscribed to a globally accessible network cloud and GPS location data with respect to the remote recipient can be transmitted to the network cloud via a mobile communication device. A rendering job including job metadata with respect to a submitter can be transmitted to the network cloud and a list of recipients capable of receiving the rendering job in the network cloud can be provided. The rendering job metadata can be matched along with the recipient GPS location data to determine an appropriate print center in order to submit the rendering job. The rendering job can then be delivered to the recipient based on the location data thereby maintaining complete privacy with respect to location of the recipient.

The rendering job can be delivered to the remote recipient via the print center and/or an add-on service. The cloud stores and manages the data associated with the remote recipient, the submitter, and the print center. The print center data can be obtained by querying an external, publicly available database and can be administered manually by a service administrator. The location data with respect to the remote recipient can be determined utilizing a GPS device. The system further notifies the recipient regarding a pending rendering job at the print center based on the preferences of the recipient via the add-on service. Such an approach thereby provides an automated rendering job selection and delivery process with respect to the remote recipient in a cloud environment.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
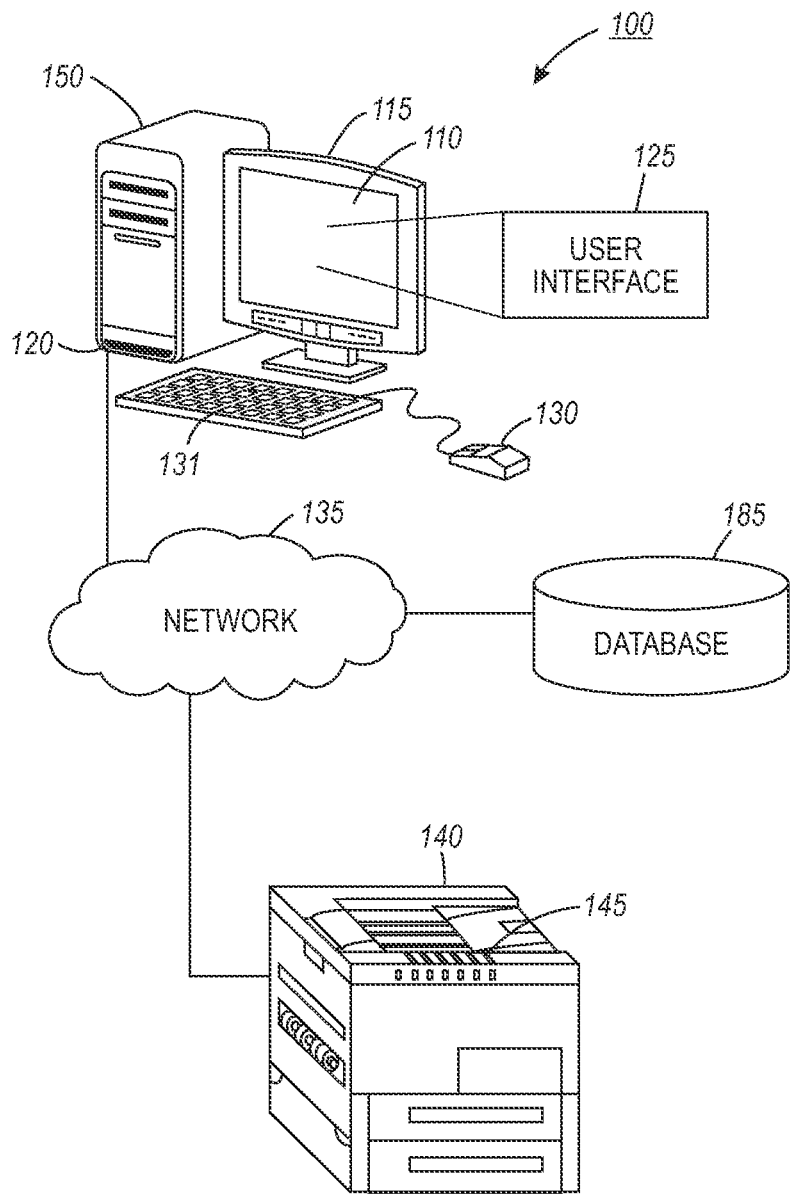
FIG. 1 is provided as an exemplary diagram of data processing environments in which embodiments of the present invention may be implemented.

FIG. 1 is provided as an exemplary diagram of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

Referring to FIG. 1, system 100 includes a rendering device 140 coupled to a data-processing apparatus 110 through a network 135. In some embodiments, rendering device 140 may be a rendering device such as a printer, scanner, copy machine, etc. In other embodiments, rendering device 140 may be a MFD. The data-processing apparatus 110 may be, for example, a personal computer or other computing device, and generally includes a central processor 120, a display device 115, a keyboard 131, and a pointing device 130 (e.g., mouse, track ball, pen device, or the like). Additional input/output devices such as the rendering device 140 may be included in association with the data-processing apparatus 110 as desired.

Figure 2:
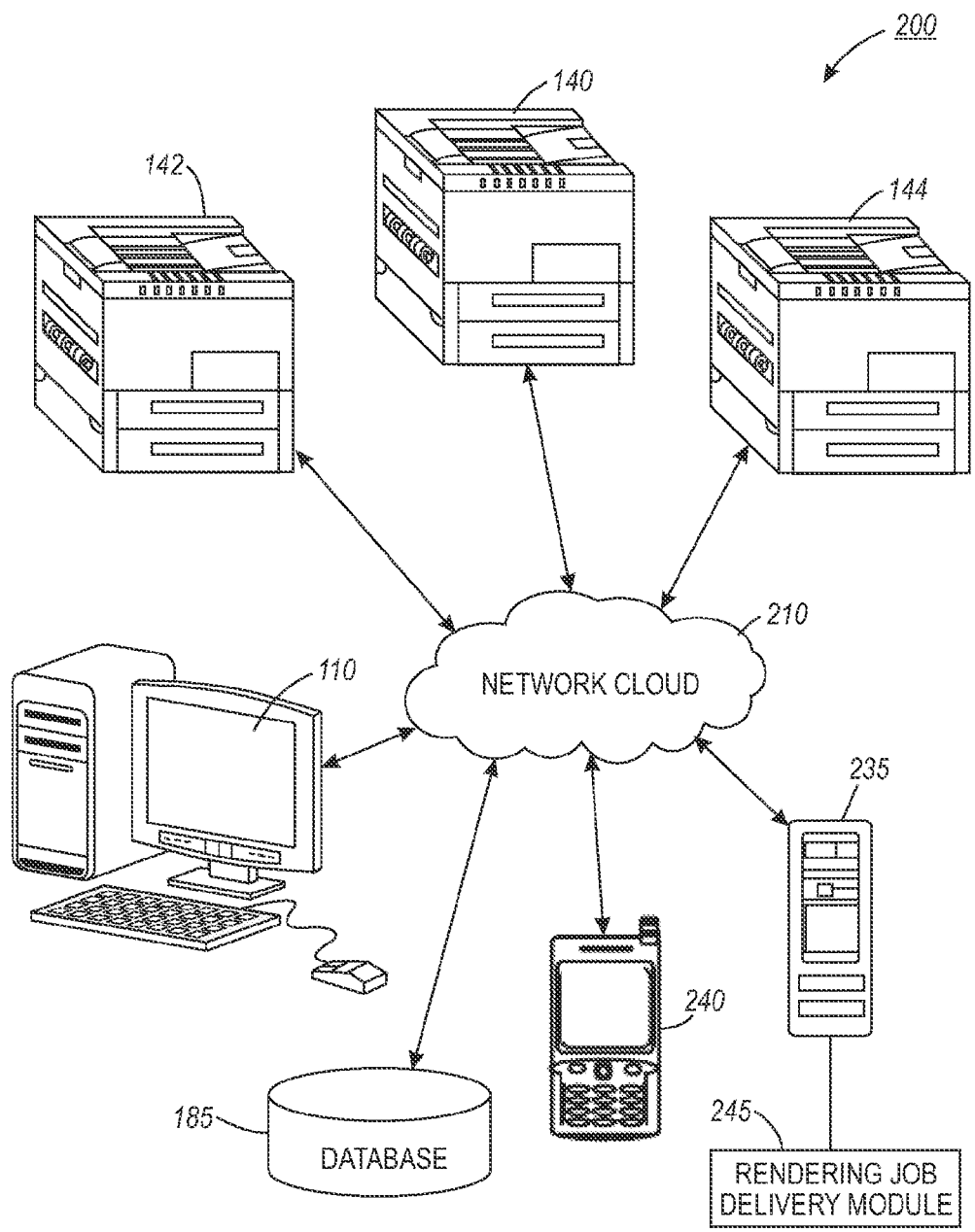
FIG. 2 illustrates a graphical representation of a rendering job delivery system associated with a MFD network cloud, in accordance with the disclosed embodiments.

Note that as utilized herein, the term rendering device may refer to an apparatus or system such as a printer, scanner, fax machine, copy machine, etc., and/or a combination thereof (e.g., an MFD). Preferably, rendering device 140 is a MFD capable of multiple rendering functions such as printing, copying, scanning, faxing, etc. In some embodiments, the rendering device 140 may be implemented with a single rendering function such as printing. In other embodiments, the rendering device 140 can be configured to provide multiple rendering functions such as scanning, faxing, printing, and copying. Note that the rendering devices 142 and 144 illustrated herein with respect to FIG. 2 are generally analogous or similar to rendering device 140.

A non-limiting example of an MFD that can be utilized as rendering devices 140, 142, and/or 144 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of a MFD that can be utilized as rendering devices 140, 142, and/or 144 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of a MFD that can be utilized as rendering devices 140, 142, and/or 144 is disclosed in U.S. Pat. No. 5,920,405, entitled "Multifunction Device With Printer/Facsimile Contention Selection," which issued on Jul. 6, 1999 to McIntyre, et al. U.S. Pat. No. 5,920,405, which is incorporated herein by reference in its entirety, is also assigned to the Xerox Corporation of Stamford, Conn.

The data-processing apparatus 110 can be coupled to the rendering device 140 (and other rendering devices) through a computer network 135. The network 135 may employ any network topology, transmission medium, or network protocol. The network 135 may include connections such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The rendering device 140 can be equipped with a user interface 145 such as a panel menu. The panel menu may be utilized by a user to select features and enter other data to the rendering device 140. Such interfaces may include, for example, touch screen user displays having touch activated keys for navigating through an option menu or the like. A driver program, for example, can be installed on the data-processing apparatus 110 and can reside on the host device's hard drive 150. The driver program may be activated through an application interface so that a user may generate a print job with the driver for processing by the rendering device 140.

The data-processing apparatus 110 also includes a GUI 125 for communicating rendering features for processing, for example, a print job to a user and accepting the user's selection of available rendering features. The user interface 125 displays information and receives data through device display and/or the keyboard/mouse combination. The interface 125 also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc.

Note that the user interface as utilized herein generally refers to a type of environment that represents programs, files, options, and so forth by means of graphically displayed icons, menus, and dialog boxes on a screen. The input device of the rendering device 140, for example, may be a local user interface 145 such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

The following description is presented with respect to embodiments of the present invention, which can be embodied in the context of a data-processing apparatus 110 and rendering device 140 depicted in FIG. 1. The present invention, however, is not limited to any particular application or any particular environment. Instead, those skilled in the art will find that the system and methods of the present invention may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

FIG. 2 illustrates a graphical representation of a rendering job delivery system 200 associated with a network cloud 210, in accordance with the disclosed embodiments. The rendering job delivery system 200 generally includes a cloud infrastructure 210 associated with one or more multi-function devices 140, 142, and 144, data-processing system 110, mobile communication devices 240, and servers 235. Data-processing system 110 depicted in FIG. 1 can be, for example, a server. Other devices such as, for example, desktops, network devices, palmtops, mobile phones, etc. may also be included in the cloud infrastructure 210, as service providers. The multi-function devices 140, 142, and 144 can be located remotely with respect to each other, or alternatively, they may be located locally with respect to each other.

As used herein, 'cloud' may refer to a collection of resources (e.g., hardware, data and/or software) provided and maintained by an off-site or off-premise party (e.g., third party), wherein the collection of data and resources can be accessed by an identified user via a network. The resources can include data storage services, data processing services (e.g., applications), and many other services that are conventionally associated with and reside within personal computers or local or 'on-premise' servers. In general, cloud computing may be employed to perform services in a dissociative way, i.e., the client may not know where the service is performed as long as the service is performed with the expected quality of service. Cloud computing can be employed to solve "grid" scale problems that may require an inordinate amount of time and resources for a single computer to solve. For example, in cloud computing, mining large amounts of data from the fleet of MFDs 140, 142, and 144 can be broken into much smaller pieces that are executed in parallel, and the results may be combined at the end.

The MFD is an office machine, which incorporates the functionality of multiple devices in one, so as to provide centralized document management, document distribution and production in a large-office setting and the like. The typical MFD may act as a combination of a printer, scanner, photocopier, fax, and e-mail. While three multi-function devices 140, 142, and 144 are shown by way of example, it is to be appreciated that any number of rendering devices may be linked to the network such as two, four, six or more rendering devices. In general, the multi-function devices 140, 142, and 144 can be employed to perform a rendering output function (e.g., printing, scanning, copying, faxing, etc) within a networked environment. Note that multi-function devices 140, 142, and 144 are generally analogous to one another.

A rendering job delivery module 245 associated with the network cloud 210 can be employed to track and deliver a rendering job with respect to a remote recipient based on a GPS (Global Positioning System) location data. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as USB drives, Flash drives, hard disk drives, recordable DVDs and CD-ROMS, etc, and transmission media such as digital and/or analog communication links. Examples of transmission media can also include devices such as modems, which permit information to be transmitted over standard telephone lines and/or the more advanced digital communications lines.

Figure 3:
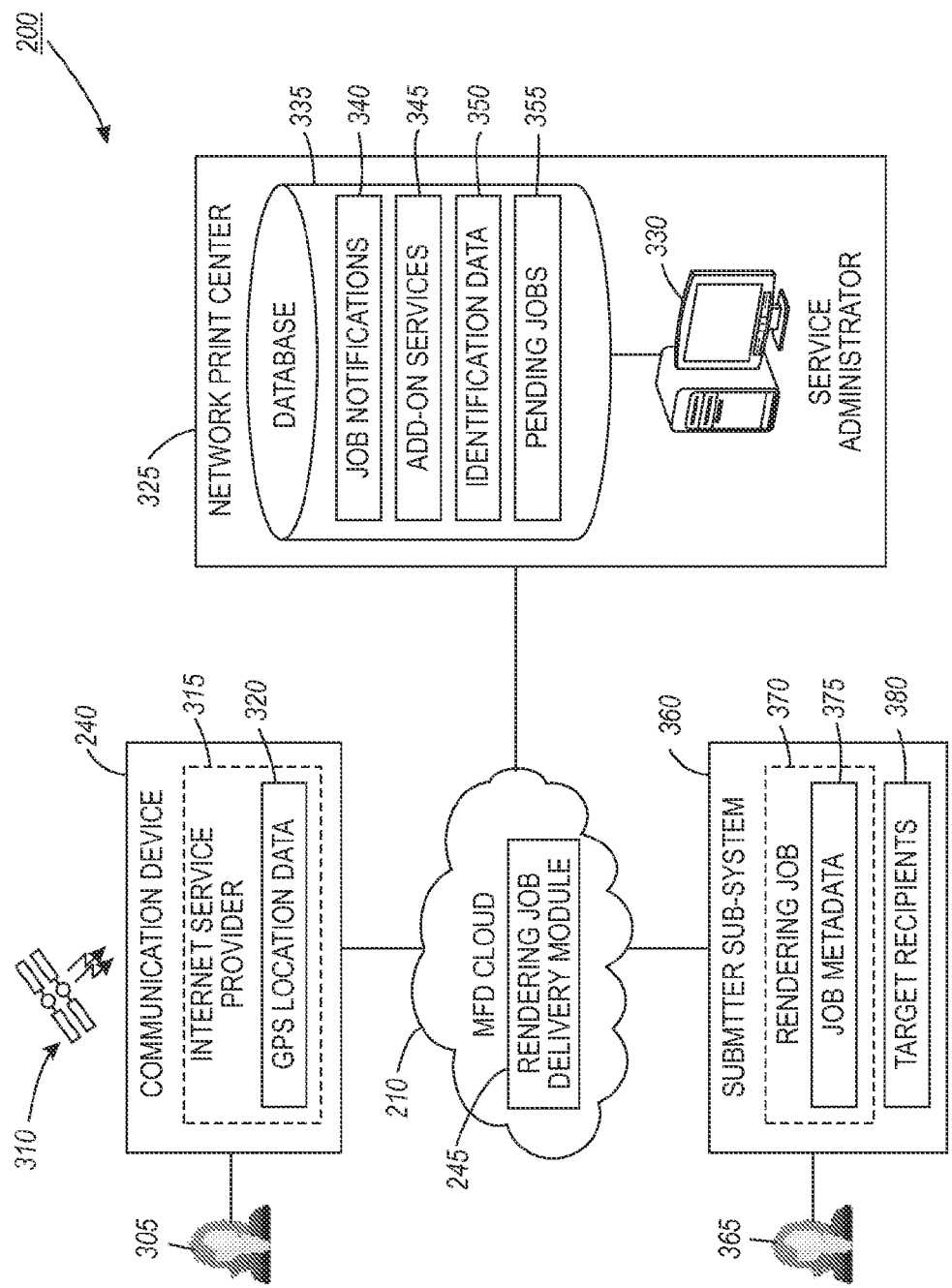
FIG. 3 illustrates a block diagram of the rendering job delivery system, in accordance with the disclosed embodiments.

FIG. 3 illustrates a block diagram of the rendering job delivery system 200, in accordance with the disclosed embodiments. Note that in FIGS. 1-4, identical or similar blocks are generally indicated by identical reference numerals. The rendering job delivery system 200 provides effective commercial interactions between a submitter 365 and a remote recipient 305 via the cloud 210. The delivery system 200 generally includes the mobile communication device 240, a submitter sub-system 360, and a networked print center 325 that are operatively configured in association with the network cloud 210. The network cloud 210 stores and manages the data associated with the remote recipient 305, the submitter 365, and the networked print center 325.

The remote recipient 305 typically accesses the mobile communication device 240 in order to subscribe and configure an account along with communication location data 320 in the network cloud 210. Note that the remote recipient 305 can be, for example, a customer, a financial institution, and/or a purchaser. The remote recipient 305 provides the location data 320 to the network cloud 210 via an Internet service provider 315.

The location data 320 with respect to the recipient 305 can be typically obtained via a GPS device 310. The GPS device 310 can be a multiple-satellite based radio positioning system in which each GPS satellite transmits data that permits a user to precisely measure the distance from selected ones of the GPS satellites to the antenna and to thereafter compute position, velocity, and time parameters to a high degree of accuracy, using known triangulation techniques. The signals provided by the GPS device 310 can be received both globally and continuously.

The submitter 365 further access the submitter sub-system 360 in order to view a list of target recipients 380 available and capable of receiving the rendering job 370 and transmits the rendering job 370 along with job metadata 375 to the network cloud 210. Note that the submitter 365 can be, for example, a trade merchant, an advertiser, and/or a retailer. For example, an advertiser may typically subscribe to the cloud 210 in order to provide one or more target recipients 380 with customized print media such as coupons for a local restaurant at their hotel door due to a previous visit in an automated fashion. The rendering job 370 provided by the submitter 365 can be typically delivered to the recipient 305 based on the location data 320 while maintaining complete privacy.

Note that as utilized herein, the ter "metadata" generally refers to "data about data", or of any sort of data contained in any media. An item of metadata may describe an individual datum, or content item, or a collection of data including multiple content items and hierarchical levels, for example, a database schema. In data processing, metadata is definitional data that provides information about/or documentation of other data managed within an application or environment. For example, metadata would document data about data elements or attributes, (name, size, data type, etc.), data about records or data structures (length, fields, columns, etc.), and data about data (where it is located, how it is associated, ownership, etc.). Metadata may include descriptive information about the context, quality and condition, or characteristics of the data. Metadata can be thought of as data used to identify, describe, and locate resources. For instance, subject gateways provide information (metadata) about individual Web sites, typically including the author, the title, the URL (Web address), and a brief description. The job metadata 375 associated with the rendering job 370 includes color, duplex, paper type, bound, and stapled, etc.

The rendering job delivery module 245 associated with the network cloud 210 matches the job metadata 375 associated with the rendering job 370 along with the recipient location data 320 in order to determine an appropriate print center 325 for submitting the rendering job 370. The networked print center 325 associated with the delivery system 200 includes a service administrator 330, and a database 335. The database 335 associated with the print center 325 includes details such as a job notification 340, an add-on service 345, an identification data 350, and a list of pending rendering jobs 355 with respect to the recipient 305.

The print center identification data 350 can be obtained by querying external, publicly available database and can be administered manually by the service administrator 330. The delivery system 200 delivers the rendering job 370 with respect to the remote recipient 305 via the print center 325 and/or the add-on service 345 based on the location data 320 by maintaining complete privacy with respect to the user 305. The system 200 further notifies the recipient 305 regarding the pending rendering jobs 355 at the print center 325 based on the preferences of the recipient 305 via the add-on service 345.

Figure 4:
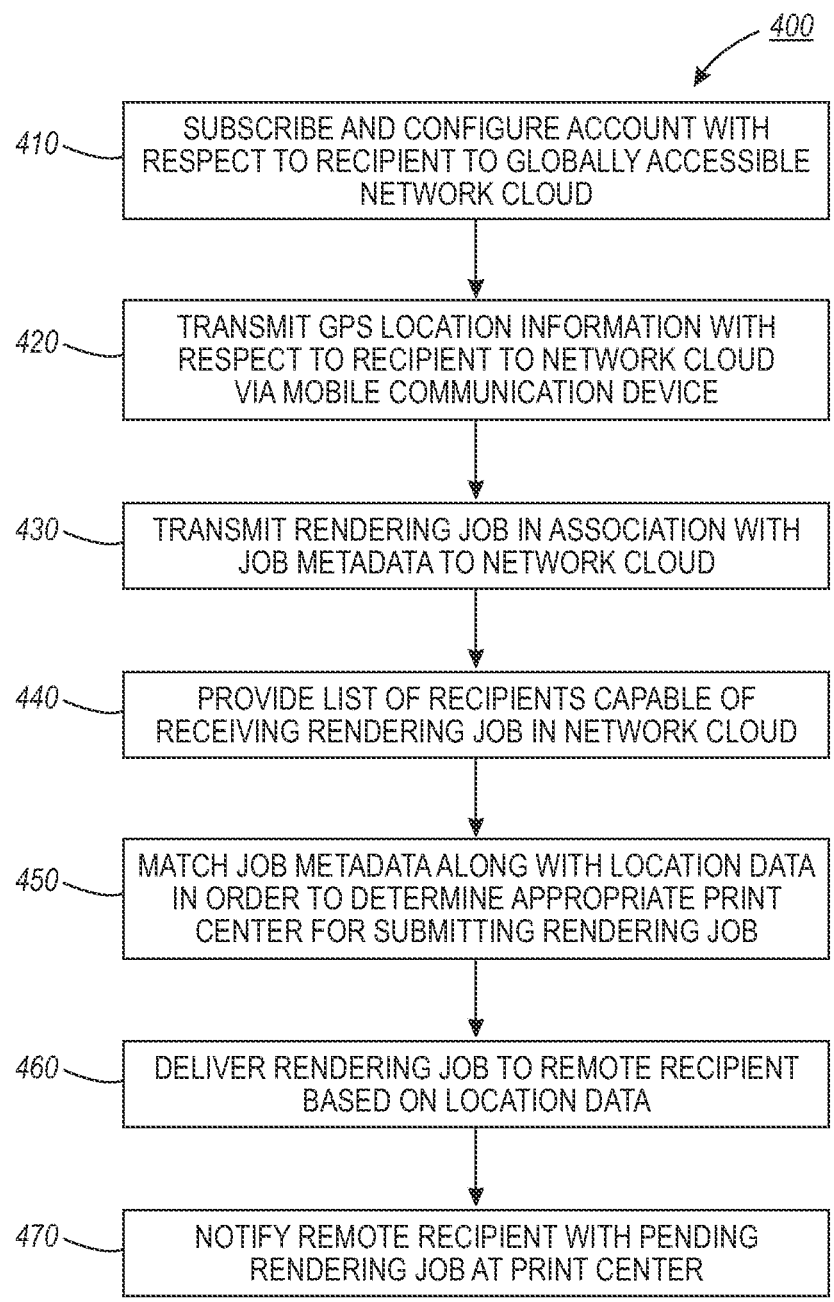
FIG. 4 illustrates a high level flowchart of operation illustrating logical operational steps of a method for delivering a rendering job with respect to a remote recipient based on location data, in accordance with the disclosed embodiments.

FIG. 4 illustrates a high level flow chart of operation illustrating logical operational steps of a method 400 for delivering the rendering job 370 with respect to the remote recipient 305, in accordance with the disclosed embodiments. Note that the method 400 can be implemented in the context of a computer-useable medium that contains a program product including, for example, a module or group of modules. An account along with the location data 320 can be subscribed and configured by the recipient 305 to the globally accessible network cloud 210, as illustrated at block 410. The GPS location data 320 with respect to the remote recipient 305 can be transmitted to the network cloud 210 via the mobile communication device 240, as indicated at block 420. The rendering job 370 associated with the job metadata 375 with respect to the submitter 365 can be transmitted to the network cloud 210 via the submitter sub-system 360, as depicted at block 430.

A list of recipients capable of receiving the rendering job 370 in the network cloud 210 can be provided, as indicated at block 440. The job metadata 375 associated with the rendering job 370 can be matched along with the location data 320 in order to determine the appropriate print center 325 in the network cloud 210, as depicted at block 450. The rendering job 370 can be delivered to the recipient 305 based on the location data, as illustrated at block 460. The remote recipient 305 can be further notified with the pending rendering jobs 355 with respect to the print center 325 via the add-on service 345, as indicated at block 470. The wireless location based rendering job delivery system and method thereby provides an automated rendering job selection and delivery process with respect to the remote recipients in the cloud environment.

Note that programs defining functions with respect to the disclosed embodiments may be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including, for example, Ethernet, the Internet, wireless networks, other networked systems. Thus, the method 400 described herein can be deployed as process software in the context of a computer system or data-processing system as that depicted in FIGS. 1-2.

Based on the foregoing, it can be appreciated that embodiments are disclosed, including a method for remotely delivering a rendering job. Such a method can include: subscribing an account with respect to a recipient to a network cloud in order to thereafter transmit location data with respect to the recipient to the network cloud via a mobile communication device; transmitting a rendering job in association with job metadata with respect to a submitter to the network cloud in order to thereafter view a list of recipients capable of receiving the rendering job in the network cloud; and matching the job metadata along with the location data to determine an appropriate print center for submitting the rendering job in order to thereafter deliver the rendering job to the recipient based on the location data thereby maintaining privacy with respect to location of the recipient.

An alternative embodiment of such a method can include, for example, storing and managing at least one identification data with respect to the remote recipient and the submitter in the network cloud, and/or storing and managing at least one identification data with respect to the print center in the network cloud. In another embodiment of such a method, an operation can be implemented for delivering the rendering job to the recipient via an add-on service. In still a further embodiment of such a method, an operation can be performed for notifying the recipient regarding a pending rendering job with respect to the print center via the add-on service. Additionally, the aforementioned job metadata can be, for example, information such as a color, a duplex, a paper type, a bound, and/or stapled data. In yet other embodiments of such a method, the disclosed wireless communication device can be, for example, a global positioning device.

It can be further appreciated that in another embodiment, a system is disclosed for remotely delivering a rendering job. Such a system can include, for example, a processor, a data bus coupled to the processor, and a computer-usable medium embodying computer code. Such a computer-usable medium can be coupled to the data bus and the computer program code can include: instructions executable by the processor and configured for subscribing an account with respect to a recipient to a network cloud in order to thereafter transmit location data with respect to the recipient to the network cloud via a mobile communication device; transmitting a rendering job in association with job metadata with respect to a submitter to the network cloud in order to thereafter view a list of recipients capable of receiving the rendering job in the network cloud; and matching the job metadata along with the location data to determine an appropriate print center for submitting the rendering job in order to thereafter deliver the rendering job to the recipient based on the location data thereby maintaining privacy with respect to location of the recipient.

In other embodiments of such a system, the instructions can be further configured for storing and managing identification data with respect to the remote recipient and the submitter in the network cloud and/or for storing and managing identification data with respect to the print center in the network cloud. In yet other embodiments of such a system, the instructions can be further configured for delivering the rendering job to the recipient via an add-on service. In yet other embodiments of such a system, the instructions can be further configured for notifying the recipient regarding a pending rendering job with respect to the print center via the add-on service. In still other embodiments of such system, the job metadata can include information such as, for example, a color, a duplex, a paper type, a bound, and/or stapled data. In some embodiments of such a system, the wireless communication device can be, for example, a global positioning device.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for remotely delivering a submitter submitted rendering job, comprising:

subscribing an account associated with a recipient to a network cloud;

transmitting location data of said recipient to said network cloud via a mobile communication device;

transmitting a rendering job from a submitter to said network cloud;

transmitting metadata associated with said submitter with said rendering job;

presenting said submitter with a list of recipients capable of receiving said rendering job based on said location data;

determining an appropriate print center for submitting said rendering job based on said location data; and delivering said rendering job to said print center for retrieval by said recipient thereby maintaining privacy with respect to location of said recipient.

2. The method of claim 1 further comprising storing and managing at least one identification data with respect to said recipient and said submitter in said network cloud.

3. The method of claim 1 further comprising storing and managing at least one identification data with respect to said print center in said network cloud.

4. The method of claim 1 further comprising delivering said rendering job to said recipient via an add-on service.

5. The method of claim 1 further comprising notifying said recipient, based on recipient's preferences, regarding a pending rendering job with respect to said print center via said add-on service.

6. The method of claim 1 wherein said job metadata comprises at least one of the following types of information: a color, a duplex, a paper type, a bound, and a stapled data and wherein said rendering job comprises a coupon.

7. The method of claim 1 wherein said mobile communication device comprises a global positioning device.

8. A system for remotely delivering a submitter submitted rendering job, said system comprising:

a processor;

a data bus coupled to said processor; and a computer-usable medium embodying computer code, said computer-usable medium being coupled to said data bus, said computer code comprising instructions executable by said processor and configured for:

subscribing an account associated with a recipient to a network cloud;

transmitting location data of said recipient to said network cloud via a mobile communication device;

transmitting a rendering job from a submitter to said network cloud;

transmitting metadata associated with said submitter with said rendering job;

presenting said submitter with a list of recipients capable of receiving said rendering job based on said location data;

determining an appropriate print center for submitting said rendering job based on said location data; and delivering said rendering job to said print center for retrieval by said recipient thereby maintaining privacy with respect to location of said recipient.

9. The system of claim 8 wherein said instructions are further configured for storing and managing identification data with respect to said recipient and said submitter in said network cloud.

10. The system of claim 8 wherein said instructions are further configured for storing and managing identification data with respect to said print center in said network cloud.

11. The system of claim 8 wherein said instructions are further configured for delivering said rendering job to said recipient via an add-on service.

12. The system of claim 8 wherein said instructions are further configured for notifying said recipient, based on recipient's preferences, regarding a pending rendering job with respect to said print center via said add-on service.

13. The system of claim 8 wherein said job metadata comprises at least one of the following types of information: a color, a duplex, a paper type, a bound, and a stapled data and wherein said rendering job comprises a coupon.

14. The system of claim 8 wherein said mobile communication device comprises a global positioning device.

15. A system for remotely delivering a submitter submitted rendering job, said system comprising:

a processor;

a data bus coupled to said processor; and a computer-usable medium embodying computer code, said computer-usable medium being coupled to said data bus, said computer code comprising instructions executable by said processor and configured for:

subscribing an account associated with a recipient to a network cloud;

transmitting location data of said recipient to said network cloud via a mobile communication device;

transmitting a rendering job from a submitter to said network cloud;

transmitting metadata associated with said submitter with said rendering job;

presenting said submitter with a list of recipients capable of receiving said rendering job in said network cloud based on said location data;

determining an appropriate print center for submitting said rendering job based on said location data;

delivering said rendering job to said print center for retrieval by said recipient thereby maintaining privacy with respect to location of said recipient;

storing and managing identification data associated with said recipient and said submitter in said network cloud; and storing and managing identification data associated with said print center in said network cloud.

16. The system of claim 15 wherein said instructions are further configured for delivering said rendering job to said recipient via an add-on service.

17. The system of claim 15 wherein said instructions are further configured for notifying said recipient, based on recipient's preferences, regarding a pending rendering job with respect to said print center via said add-on service.

18. The system of claim 15 wherein said job metadata comprises at least one of the following types of information: a color, a duplex, a paper type, a bound, and a stapled data and wherein said rendering job comprises a coupon.

19. The system of claim 15 wherein said mobile communication device comprises a global positioning device.

20. The system of claim 15 wherein:

said job metadata comprises at least one of the following types of information: a color, a duplex, a paper type, a bound, and a stapled data; and said mobile communication device comprises a global positioning device.

* * * * *